(12) United States Patent
Yamada

(10) Patent No.: US 10,372,303 B2
(45) Date of Patent: Aug. 6, 2019

(54) DEVICE AND METHOD FOR SELECTION AND REPRODUCTION OF CONTENT

(71) Applicant: SONY CORPORATION, Tokyo (JP)

(72) Inventor: Keiichiro Yamada, Tokyo (JP)

(73) Assignee: SONY CORPORATION, Tokyo (JP)

(*) Notice: Subject to any disclaimer, the term of this patent is extended or adjusted under 35 U.S.C. 154(b) by 426 days.

(21) Appl. No.: 14/371,595

(22) PCT Filed: Jan. 31, 2013

(86) PCT No.: PCT/JP2013/000522
§ 371 (c)(1),
(2) Date: Jul. 10, 2014

(87) PCT Pub. No.: WO2013/118472
PCT Pub. Date: Aug. 15, 2013

(65) Prior Publication Data
US 2015/0169155 A1 Jun. 18, 2015

(30) Foreign Application Priority Data
Feb. 8, 2012 (JP) .............................. 2012-025036

(51) Int. Cl.
*G06F 16/28* (2019.01)
*G06F 16/64* (2019.01)
(Continued)

(52) U.S. Cl.
CPC .......... *G06F 3/0484* (2013.01); *G06F 16/285* (2019.01); *G06F 16/638* (2019.01); *G06F 16/639* (2019.01); *G06F 16/64* (2019.01)

(58) Field of Classification Search
CPC ......... G06F 17/30775; G06F 17/30769; G06F 3/0484; G06F 17/30598; G06F 16/285; G06F 16/638; G06F 16/639; G06F 16/64
See application file for complete search history.

(56) References Cited

U.S. PATENT DOCUMENTS

2004/0143598 A1* 7/2004 Drucker ............ G06F 17/30011
2004/0215657 A1 10/2004 Drucker et al.
(Continued)

FOREIGN PATENT DOCUMENTS

JP     2009-181644 A    8/2009
WO    WO 2008/051643 A1  5/2008

OTHER PUBLICATIONS

"Highlight." Merriam-Webster.com, Merriam-Webster, www.merriam-webster.com/dictionary/highlight. Accessed May 15, 2018. (Year: 2018).*

(Continued)

*Primary Examiner* — David S Posigian
(74) *Attorney, Agent, or Firm* — Chip Law Group

(57) ABSTRACT

An apparatus includes a controller configured to generate a plurality of groups of content, control a display to display at least one content from each of at least two of the plurality of groups of content, and control the display to change display of the at least two of the plurality of groups of content based on a user command. Each group includes a plurality of content stored on a storage unit. The controller generates the plurality of groups based on information describing a selected content and information describing other content.

14 Claims, 6 Drawing Sheets

(51) Int. Cl.
*G06F 16/638* (2019.01)
*G06F 3/0484* (2013.01)

(56) References Cited

U.S. PATENT DOCUMENTS

| | | | |
|---|---|---|---|
| 2007/0033220 A1 | 2/2007 | Drucker et al. | |
| 2007/0255747 A1 | 11/2007 | Lee et al. | |
| 2008/0016465 A1* | 1/2008 | Foxenland | G06F 3/0482 715/828 |
| 2008/0062141 A1* | 3/2008 | Chandhri | G06F 3/0482 345/173 |
| 2008/0066016 A1* | 3/2008 | Dowdy | G06F 17/30775 715/854 |
| 2008/0104112 A1 | 5/2008 | Nicholl et al. | |
| 2010/0023858 A1* | 1/2010 | Ryu | G06F 3/0416 715/702 |
| 2010/0153846 A1 | 6/2010 | Roy | |
| 2010/0174987 A1* | 7/2010 | Shin | G06F 3/0482 715/702 |
| 2010/0175008 A1* | 7/2010 | Han | G11B 27/34 715/764 |
| 2011/0138331 A1* | 6/2011 | Pugsley | G06F 17/30026 715/835 |
| 2013/0007617 A1* | 1/2013 | Mackenzie | G06F 17/30017 715/716 |
| 2013/0091458 A1* | 4/2013 | Kang | G06F 3/0482 715/784 |

OTHER PUBLICATIONS

International Search Report dated Apr. 26, 2013 in PCT/JP2013/000522.

* cited by examiner

FIG. 3

DEVICE AND METHOD FOR SELECTION AND REPRODUCTION OF CONTENT

TECHNICAL FIELD

The present disclosure relates to a reproducing device, a method, and a program encoded on a non-transitory computer readable medium thereof, and in particular to a reproducing device, a method thereof, and a program encoded on a non-transitory computer readable medium in which content variously related to content which is being reproduced can be more conveniently selected and reproduced.

BACKGROUND ART

In the related art, there is a shuffle playback function in which, as a function of reproducing a piece of music (content) by a reproducing device, all pieces of music which are stored in the reproducing device are reproduced in a random order. In addition, there is a case where a user who is listening to a piece of music which is being reproduced using the shuffle playback function using a reproducing device wants to listen to other pieces of music which are related to the piece of music which is being reproduced, such as other pieces of music by the same artist as the piece of music which is being reproduced, or other pieces of music which were released in the same decade as the piece of music which is being reproduced.

In this case, in the reproducing device in the related art, it was necessary for a user to operate the reproducing device after memorizing the name of the artist, or the release year of the piece of music which is being reproduced, and select a desired piece of music after displaying a screen for selecting the piece of music for each artist name, or each release year. That is, in the reproducing device in the related art, it took time for operating when selecting a desired piece of music, and reproducing the music, when a user wanted to listen to a piece of music which is related to the piece of music which is being reproduced.

Therefore, various methods have been proposed in which a user is able to easily select a piece of music related to the piece of music which is being reproduced.

For example, in PTL 1, an audio reproducing device is disclosed, in which a plurality of pieces of music which are selected based on an image which is similar to an image correlated with a piece of music which is being reproduced are suggested, and a user is caused to select a piece of music to be reproduced.

CITATION LIST

Patent Literature

PTL 1: Japanese Unexamined Patent Application Publication No. 2009-181644

SUMMARY OF INVENTION

Technical Problem

However, the audio reproducing device which is disclosed in PTL 1 merely suggests pieces of music which are selected based on the similarity of an image which is correlated with the piece of music which is being reproduced, and does not suggest pieces of music which are variously related to the piece of music which is being reproduced other than the similarity of the image. Accordingly, for example, it was not convenient for a user who wants to reproduce a piece of music by easily selecting music among the pieces of music which are variously related to the artist name, the release year, or the like.

The present disclosure has been made in consideration of such a situation, and enables reproducing of content which is variously related to content which is being reproduced by easily selecting the content.

Solution to Problem

The present invention broadly comprises an apparatus, method, and a program encoded on a non-transitory computer readable medium. In one embodiment, the apparatus includes a controller configured to generate a plurality of groups of content, control a display to display at least one content from each of at least two of the plurality of groups of content, and control the display to change display of the at least two of the plurality of groups of content based on a user command. Each group includes a plurality of content stored on a storage unit. The controller generates the plurality of groups based on information describing a selected content and information describing other content.

Advantageous Effects of Invention

According to the aspects of the present disclosure, it is possible to reproduce content which is variously related to content which is being reproduced further conveniently.

BRIEF DESCRIPTION OF DRAWINGS

FIG. 3 is a diagram which illustrates a display example of an operation screen.

DESCRIPTION OF EMBODIMENTS

Hereinafter, a specific embodiment to which the present technology is applied will be described in detail with reference to drawings.

Figure 1:
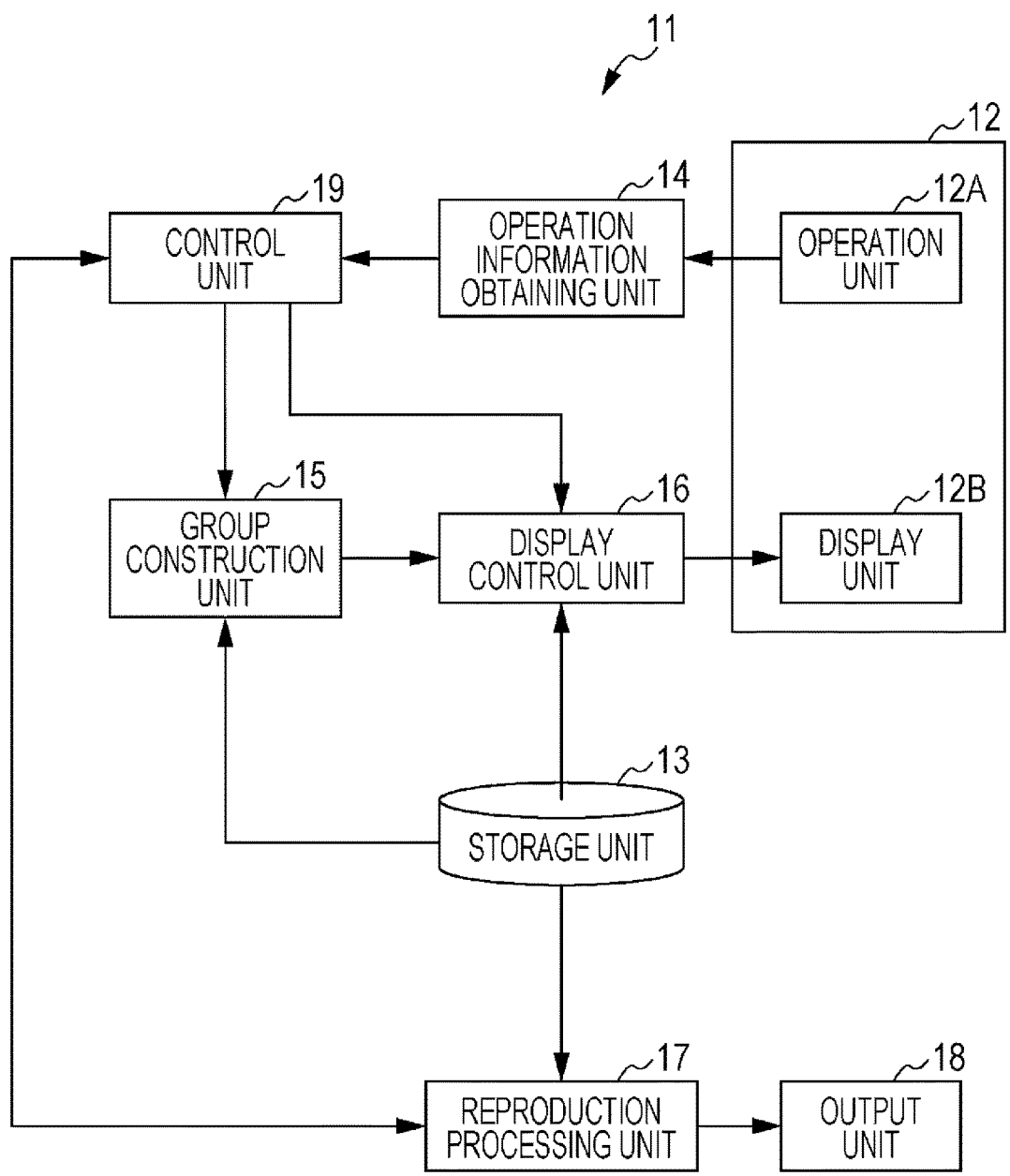
FIG. 1 is a block diagram which illustrates a configuration example of a first embodiment of a reproducing device to which the present technology is applied.

FIG. 1 is a block diagram which illustrates a configuration example of an embodiment of a reproducing device to which the present technology is applied.

In FIG. 1, a reproducing device 11 is configured by including a touch panel 12, a storage unit 13, an operation information obtaining unit 14, a group construction unit 15, a display control unit 16, a reproducing process unit 17, an output unit 18, and a control unit 19, and reproduces a piece of music (content) which is selected according to an operation by a user.

The touch panel 12 is configured by including an operation unit 12A and a display unit 12B. The operation unit 12A is configured, for example, by a sensor or the like which detects a change in electrostatic capacitance on the surface of the touch panel 12, detects a touch of a user with respect to the surface of the touch panel 12, and supplies touch data which denotes a touched portion to the operation information obtaining unit 14. The display unit 12B is configured by, for example, a liquid crystal panel, an organic EL (Electro-Luminescence) panel, or the like, and displays an operation screen (refer to FIG. 3 to be described later) on which an image or the like of a jacket of an album in which pieces of music are recorded according to the image data which is supplied from the display control unit 16.

The storage unit 13 is configured by, for example, a flash memory which is built into, or detachable from the reproducing device 11 (for example, EEPROM (Electronically Erasable and Programmable Read Only Memory)) or the like, and stores a plurality of data items of pieces of music (audio file). In addition, meta information as information relating to respective pieces of music is stored in the storage unit 13 by being correlated with the pieces of music. The meta information includes, for example, a title as the name of a piece of music, an artist name as the name of a singer who sang the piece of music, an album title as the name of an album in which the piece of music is recorded, a composer as the name of a composer of the piece of music, a release year denoting the year in which the piece of music was released, or the like. Further, the storage unit 13 stores a jacket image of the album in which the piece of music is recorded as an image relating to respective pieces of music.

The operation information obtaining unit 14 obtains operation information denoting operation contents which are operated by a user based on the touch data which is supplied from the operation unit 12A of the touch panel 12, and supplies the operation information to the control unit 19.

For example, when the touch data denotes that a touched portion is not moved, and a touch left the touched portion in a short time, the operation information obtaining unit 14 obtains operation information which denotes that a user performs an operation of one touch with respect to the surface of the touch panel 12 using a finger (hereinafter, referred to as tap, appropriately). In addition, when the touch data denotes that the touched portion has moved, the operation information obtaining unit 14 obtains operation information which denotes that a user has performed an operation of sliding a finger while touching the surface of the touch panel 12 (hereinafter, appropriately referred to as flick). In addition, the operation information includes information denoting a tapped position when there is a tapping operation by a user, and information denoting the flicked direction when there is a flicking operation of a user.

The group construction unit 15 constructs groups in which a plurality of pieces of music stored in the storage unit 13 are classified, based on meta information of the piece of music as a reproduction target in the reproducing device 11 according to a control of the control unit 19. For example, the group construction unit 15 retrieves the storage unit 13 based on an artist name, or a release year of the reproduction target and constructs a group in which pieces of music having the same artist name as the piece of music as the reproduction target are classified, or a group in which pieces of music having the same release year as the piece of music as the reproduction target are classified.

The display control unit 16 supplies image data to the display unit 12B of the touch panel 12 according to a control of the control unit 19, and controls a display of an operation screen which is displayed on the display unit 12B. For example, the display control unit 16 displays a jacket image of an album in which the piece of music as the reproduction target (which is being reproduced) is recorded in the reproducing device 11 on the operation screen. In addition, the display control unit 16 displays a jacket image of an album in which the piece of music as the reproduction candidate is recorded in each group which is constructed by the group construction unit 15 based on the meta data of the piece of music of the reproduction target, with the jacket image of the piece of music of the reproduction target, on the operation screen.

The reproducing process unit 17 performs a reproducing process of a piece of music which is stored in the storage unit 13 according to a control of the control unit 19, and outputs the reproduced piece of music to the output unit 18. In addition, the reproducing process unit 17 informs the control unit 19 of a completion of reproducing of the piece of music when the piece of music as the reproduction target is reproduced to the end.

The output unit 18 is configured by, for example, a speaker or the like which is able to output music, sound, or the like, and outputs a piece of music which is reproduced by the reproducing process unit 17.

The control unit 19 controls each block which configures the reproducing device 11 according to operation information which is supplied from the operation information obtaining unit 14.

For example, the control unit 19 selects a piece of music as a reproduction target according to an operation of a user, and performs a control with respect to the reproducing process unit 17 so that the piece of music is reproduced. At the same time, the control unit 19 performs a control with respect to the group construction unit 15 so that a group based on the meta information of the piece of music as the reproduction target is constructed, and performs a control with respect to the display control unit 16 so that an operation screen according to the piece of music as the reproduction target is displayed on the display unit 12B.

In addition, a jacket image of an album in which the piece of music as the reproduction candidate is recorded is displayed on the operation screen which is displayed on the display unit 12B in each of predetermined groups among the plurality of groups which are constructed by the group construction unit 15. In addition, the control unit 19 performs a control with respect to the display control unit 16 according to the operation of a user so that a group which is displayed on the display unit 12B is changed.

Subsequently, the group of the pieces of music which is configured by the group construction unit 15 will be described with reference to FIG. 2.

Figure 2:
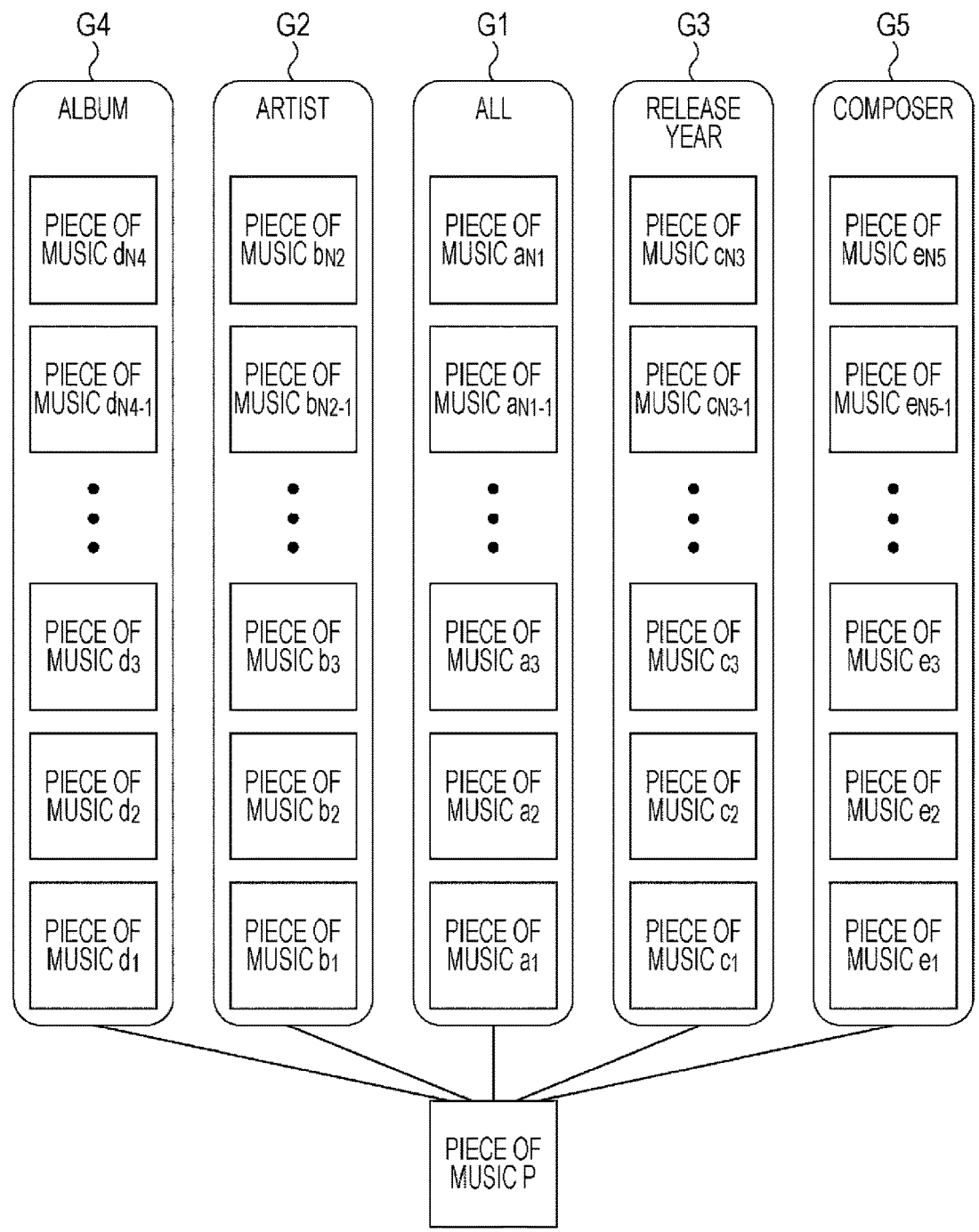
FIG. 2 is a diagram which describes groups in which pieces of music are classified.

For example, when a piece of music P is selected as a reproducing target, and is being reproduced in the reproducing device 11, the group construction unit 15 constructs five groups G1 to G5 based on the piece of music P as shown in FIG. 2.

That is, the group construction unit 15 constructs a group G1 in which all of pieces of music a which are stored in the storage unit 13 are included, a group G2 in which a pieces of music b which is sang by the same artist as the piece of music P is included, a group G3 in which a piece of music c which is released in the same year as the piece of music P is included, a group G4 in which a piece of music d which is included in the same album as the piece of music P is included, and a group G5 in which a piece of music e which is made by the same composer as the piece of music P.

For example, when the number of pieces of music N1 is stored in the storage unit 13, the group construction unit 15 creates the group G1 by assigning an order randomly from pieces of music $a_1$ to $a_{N1}$ to the piece of music a of the number of pieces of music N1. In addition, when the piece of music b of the number of pieces of music N2 is extracted by retrieving the storage unit 13 using the artist name of the piece of music P, the group construction unit 15 creates the group G2 by assigning an order randomly from pieces of music $b_1$ to $b_{N2}$ to the piece of music b of the number of pieces of music N2. Further, when the piece of music c of the number of pieces of music N3 is extracted by retrieving the storage unit 13 using the release year of the piece of music P, the group construction unit 15 creates the group G3 by assigning an order randomly from pieces of music $c_1$ to $c_{N3}$ to the piece of music c of the number of pieces of music N3.

Similarly, when the piece of music d of the number of pieces of music N4 is extracted by retrieving the storage unit 13 using the album title of the piece of music P, the group construction unit 15 creates the group G4 by assigning an order randomly from pieces of music $d_1$ to $d_{N4}$ to the piece of music d of the number of pieces of music N4. In addition, when the piece of music e of the number of pieces of music N5 is extracted by retrieving the storage unit 13 using the composer of the piece of music P, the group construction unit 15 creates the group G5 by assigning an order randomly from pieces of music $e_1$ to $e_{N5}$ to the piece of music e of the number of pieces of music N5.

In this manner, the group construction unit 15 classifies pieces of music into a piece of music having the same artist name, the same release year, the same album title, and the same composer as the piece of music P as the reproducing target, and constructs groups for each piece of music having predetermined association with the piece of music P as the reproducing target. In addition, as the association with the piece of music P as the reproducing target, the group construction unit 15 may use, for example, the player of the piece of music (guitarist or the like), lyric writer, conductor, recording studio, or the like, in addition to the artist name, release year, album title, and composer.

Subsequently, the operation screen which is displayed on the display unit 12B of the touch panel 12 will be described with reference to FIG. 3.

Figure 3:
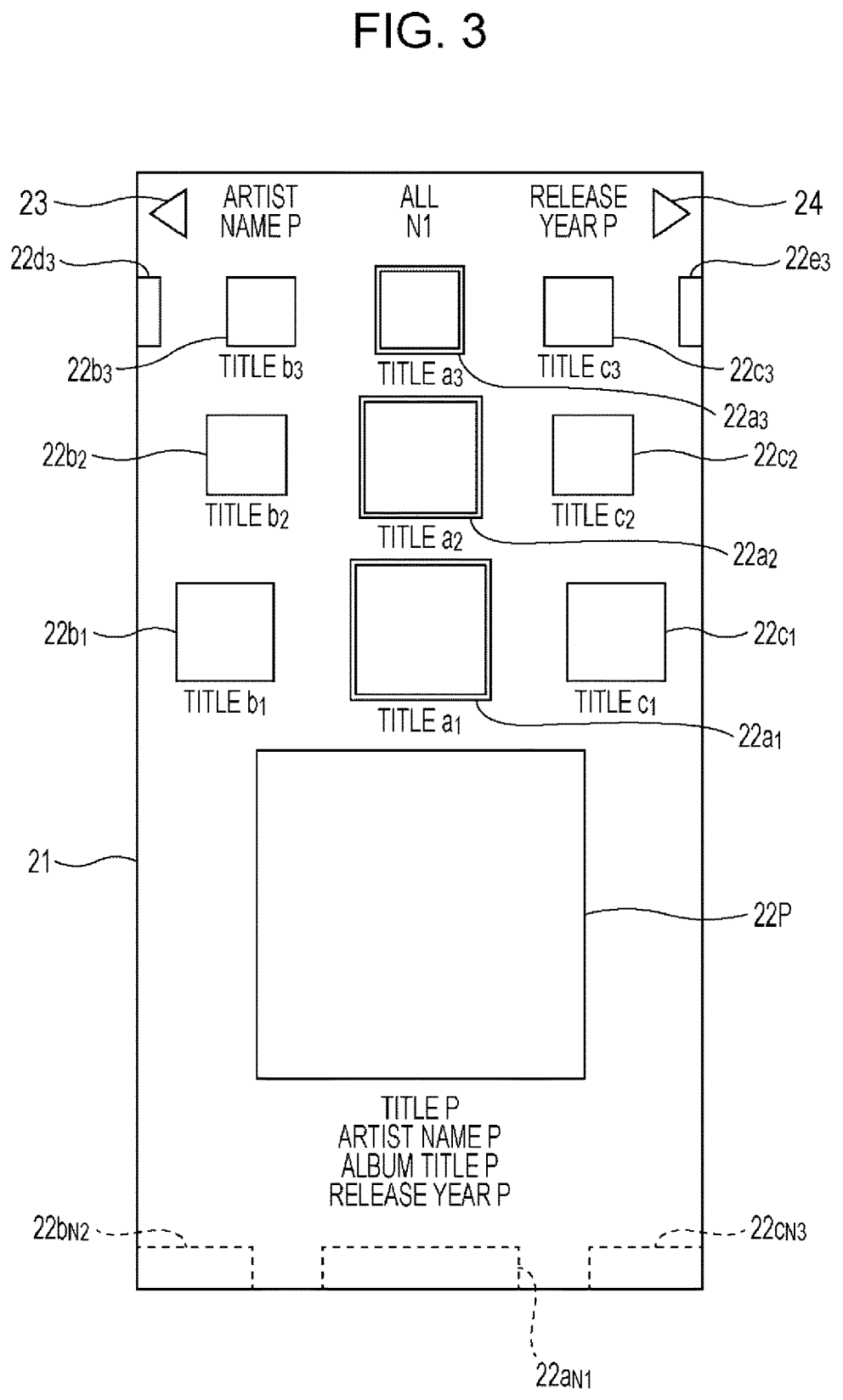

As illustrated in FIG. 3, a plurality of jacket images 22, a left direction mark 23, and a right direction mark 24 are displayed on an operation screen 21.

Among the plurality of jacket images 22 which are displayed on the operation screen 21, a jacket image 22P corresponds to the piece of music P as the reproducing target, and the other jacket image 22 corresponds to a piece of music as a reproduction candidate.

In addition, in a display example in FIG. 3, jacket images $22a_1$ to $22a_3$, and $22a_{N1}$ corresponding to the pieces of music $a_1$ to $a_3$, and $a_{N1}$ included in the group G1, jacket images $22b_1$ to $22b_3$, and $22b_{N2}$ corresponding to the pieces of music $b_1$ to $b_3$, and $b_{N2}$ included in the group G2, jacket images $22c_1$ to $22c_3$, and $22c_{N3}$ corresponding to the pieces of music $c_1$ to $c_3$, and $c_{N3}$ included in the group G3, jacket images $22d_3$ corresponding to the pieces of music $d_3$ included in the group G4, and jacket images $22e_3$ corresponding to the pieces of music $e_3$ included in the group G5 are displayed on the operation screen 21.

In addition, hereinafter, when the pieces of music $a_1$ to $a_{N1}$, and the jacket images $22a_1$ to $22a_{N1}$ are not necessary to be distinguished, they are appropriately referred to as the piece of music a and the jacket image 22a, respectively. In addition, the pieces of music $b_1$ to $b_{N2}$, and the jacket images $22b_1$ to $22b_{N2}$, the pieces of music $c_1$ to $c_{N3}$, and the jacket images $22c_1$ to $22c_{N3}$, the pieces of music $d_1$ to $d_{N4}$, and the jacket images $22d_1$ to $22d_{N4}$, and the pieces of music $e_1$ to $e_{N5}$ and the jacket images $22e_1$ to $22e_{N5}$ will be referred similarly to the piece of music a and the jacket image 22a.

The jacket image 22P corresponding to the piece of music P as the reproduction target is displayed to be larger than the jacket images 22a to 22e corresponding to the pieces of music a to e as the reproduction candidates, and is arranged at a predetermined position which is lower than the center of the operation screen 21. In addition, a title P of the piece of music P as the reproducing target, the artist name P, album title P, and release year P are displayed in order from above at the lower part of the jacket image 22P.

The jacket images 22a to 22e corresponding to the pieces of music a to e as reproduction candidates are arranged in a column in the horizontal direction in each corresponding group G1 to G5, respectively. In addition, the jacket images 22a to 22e corresponding to the pieces of music a toe as the reproduction candidates are arranged on the upper side of the jacket image 22P by three pieces, and on the lower side of the jacket image 22P by one piece.

In the display example in FIG. 3, a column of the jacket images 22a corresponding to the pieces of music a included in the group G1 is displayed at the center of the operation image 21, a column of the jacket images 22b corresponding to the pieces of music b included in the group G2 is displayed on the left of the operation image 21, and a column of the jacket images 22c corresponding to the pieces of music c included in the group G3 is displayed on the right of the operation image 21. In this manner, the columns of jacket images 22 corresponding to the pieces of music which are classified into three groups among five groups are displayed on the operation screen 21. In addition, a column of the jacket images 22d corresponding to the pieces of music d included in the group G4 is arranged on the left of the column of the jacket images 22b, though it is not shown in FIG. 3, and is displayed when a user performs flicking to the right as described with reference to FIG. 4. Similarly, a column of the jacket images 22e corresponding to the pieces of music e included in the group G5 is arranged on the right of the column of the jacket images 22c, and is displayed when a user performs flicking to the left.

In addition, in the operation screen 21, the jacket images 22 corresponding to the pieces of music from the first to third of each group are displayed in order from below on the upper side of the jacket image 22P. Further, in the operation screen 21, jacket images 22 corresponding to the last piece of music in each group are displayed to be thin on the lower side of the jacket image 22P compared to other jacket images 22 as denoted by broken lines in FIG. 3.

That is, the jacket image $22a_1$ corresponding to the first piece of music $a_1$, the jacket image $22a_2$ corresponding to the second piece of music $a_2$, and the jacket image $22a_3$ corresponding to the third piece of music $a_3$ among the pieces of music a of the number of pieces of music N1 included in the group G1 are displayed on the upper side of the jacket image 22P at the center of the operation screen 21. In addition, the jacket image $22a_{N1}$ corresponding to the music $a_{N1}$ which is the last piece of music in the group G1 is displayed on the lower side of the jacket image 22P at the center of the operation screen 21.

Similarly, on the left side of the operation screen 21, the jacket image $22b_1$ corresponding to the first piece of music $b_1$, the jacket image $22b_2$ corresponding to the second piece of music $b_2$, and the jacket image $22b_3$ corresponding to the third piece of music $b_3$ among the pieces of music b of the number of pieces of music N2 included in the group G2 are displayed on the upper side of the jacket image 22P. In addition, the jacket image $22b_{N2}$ corresponding to the music $b_{N2}$ which is the last piece of music in the group G2 is displayed on the lower side of the jacket image 22P, on the left side of the operation screen 21.

Further, similarly, the jacket image $22c_1$ corresponding to the first piece of music $c_1$, the jacket image $22c_2$ corresponding to the second piece of music $c_2$, and the jacket image $22c_3$ corresponding to the third piece of music $c_3$ among the pieces of music c of the number of pieces of music N3 included in the group G3 are displayed on the upper side of the jacket image 22P on the right of the operation screen 21. In addition, the jacket image $22c_{N3}$ corresponding to the music $c_{N3}$ which is the last piece of music in the group G3 is displayed on the lower side of the jacket image 22P, on the right side of the operation screen 21.

In addition, as described above, a column of the jacket images 22d corresponding to the pieces of music d included in the group G4 is arranged on the left side of the jacket images 22b though it is not shown in FIG. 3. In addition, a part of the jacket image $22d_3$ corresponding to the third piece of music $d_3$ included in the group G4 is displayed on the left side of the jacket image $22b_3$, in order to suggest this. Similarly, a part of the jacket image $22d_3$ corresponding to the third piece of music $e_3$ included in the group G5 is displayed on the right side of the jacket image $22c_3$.

In addition, on the upper side of the operation screen 21, a group classification name which denotes a classification of respective columns is displayed in each column of the jacket images 22 corresponding to the piece of music as the reproduction candidate.

That is, at the center of the upper side of the operation screen 21, the group classification name "All" denoting that the column of the jacket images 22a corresponding to all of the pieces of music a stored in the storage unit 13 is displayed, and the number of pieces of music "N1" of all of the pieces of music a are displayed. Similarly, on the left side of the upper side of the operation screen 21, a group classification name "Artist name P" denoting that a column of the jacket images 22b corresponding to the pieces of music b sang by the same artist as the piece of music P as the reproduction target is displayed. Further, similarly, on the right side of the upper side of the operation screen 21 a group classification name "Release year P" denoting that a column of the jacket images 22c corresponding to the pieces of music c of which the release year is the same as that of the piece of music P as the reproducing target.

In addition, at the left end on the upper side of the operation screen 21, a left direction mark 23 directing the left direction is displayed as a hint of the fact that a column of the jacket images 22d corresponding to the pieces of music d included in the group G4 is arranged at the outside of the screen on the left the left side of the operation screen 21. Similarly, at the right end on the upper side of the operation screen 21, a right direction mark 24 directing the right direction is displayed in order to suggest that a column of the jacket images 22e corresponding to the pieces of music e included in the group G5 is arranged at the outside of the screen on the right side of the operation screen 21.

In addition, on the operation screen 21, the title $a_1$ of the piece of music $a_1$ is displayed at the lower part of the jacket image $22a_1$, the title $a_2$ of the piece of music $a_2$ is displayed at the lower part of the jacket image $22a_2$, and the title $a_3$ of the piece of music $a_3$ is displayed at the lower part of the jacket image $22a_3$. Similarly, the title $b_1$ of the piece of music $b_1$ is displayed at the lower part of the jacket image $22b_1$, the title $b_2$ of the piece of music $b_2$ is displayed at the lower part of the jacket image $22b_2$, and the title $b_3$ of the piece of music $b_3$ is displayed at the lower part of the jacket image $22b_3$. Further, similarly, the title $c_1$ of the piece of music $c_1$ is displayed at the lower part of the jacket image $22c_1$, the title $c_2$ of the piece of music $c_2$ is displayed at the lower part of the jacket image $22c_2$, and the title $c_3$ of the piece of music $c_3$ is displayed at the lower part of the jacket image $22c_3$.

Such a operation screen 21 is displayed on the touch panel 12 of the reproducing device 11, and a user is able to select a piece of music as the reproduction target by performing a touch operation with respect to the surface of the touch panel 12, or to change a display of a jacket image corresponding to the piece of music as the reproduction candidate. For example, when a user performs flicking to the horizontal direction with respect to the surface of the touch panel 12, the display of the jacket images 22a to 22e corresponding to the pieces of music a to e as the reproduction candidates is slid to the horizontal direction.

Figure 4:
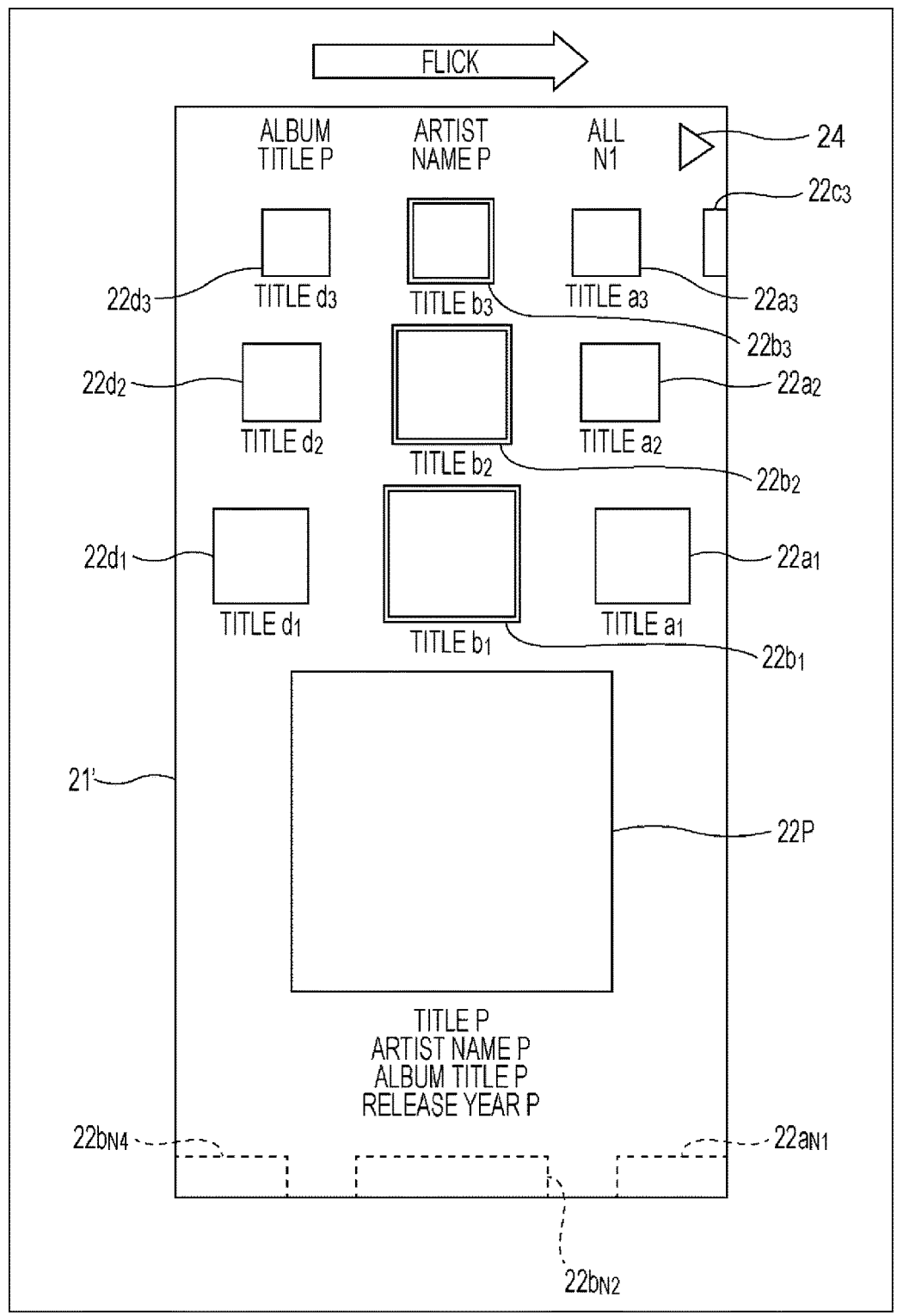
FIG. 4 is a diagram which illustrates a display example of an operation screen which is displayed when being flicked to the right.

That is, an operation screen 21' which is displayed when being flicked to the right direction with respect to the operation screen 21 in FIG. 3 is illustrated in FIG. 4.

As illustrated in FIG. 4, the column of the jacket image 22a which has been displayed at the center in the operation screen 21 in FIG. 3 is displayed by being moved to the right in the operation screen 21'. Similarly, the column of the jacket image 22b which has been displayed on the left side in the operation screen 21 in FIG. 3 is displayed by being moved to the center in the operation screen 21'. In addition, the column which is configured by the jacket images $22d_1$ to $22d_3$ which has been hinted to be arranged at the outside of the screen on the left side of the operation screen 21 in FIG. 3 is displayed on the operation screen 21'.

Similarly, on the upper side of the operation screen 21', the group classification "All" and the number of pieces of music "N1", and the group classification "Artist name P" are displayed by being moved to the right direction. In addition, on the left side on the upper side of the operation screen 21', the group classification "Album title P" denoting that the jacket images 22d corresponding to the pieces of music d which are recorded in the same album as that of the piece of music P as the reproduction target is displayed.

Further, on the operation screen 21', a part of the jacket image $22c_3$ corresponding to the third piece of music $c_3$ included in the group G3 is displayed at the outside of the screen on the right side as a hint that the column of the jacket image 22c corresponding to the pieces of music c included in the group G3. On the other hand, since the jacket images 22 are not arranged at the outside of the screen on the left side on the operation screen 21', the left direction mark 23 which is displayed at the left end on the upper side of the operation screen 21 in FIG. 3 is not displayed.

In addition, when a user performs flicking in the left direction with respect to the surface of the touch panel 12, the display of the jacket images 22a to 22e corresponding to the pieces of music a to e as the reproduction candidates is slid in the left direction, though it is not illustrated.

In this manner, in the reproducing device 11, the plurality of jacket images 22 of the pieces of music as the reproduction candidates included in the three groups among the five groups are displayed on the operation screen 21 along the vertical direction in each group. In addition, in the reproducing device 11, the display control unit 16 switches three groups which are displayed on the operation screen 21 by causing the plurality of jacket images 22 to be slid according to the flicking in the horizontal direction by a user.

In addition, when a user performs flicking downward with respect to the surface of the touch panel 12, a piece of music corresponding to the jacket images 22 which are displayed right above the jacket image 22P (immediately above) of the piece of music P as the reproduction target is newly selected as the reproducing target.

For example, in the display example in FIG. 3, the jacket image $22a_1$ is displayed right above the jacket image 22P of the piece of music P as the reproducing target, and the piece of music $a_1$ corresponding to the jacket image $22a_1$ is newly selected according to the flicking downward. According to this, the jacket image $22a_1$ is displayed at the position of the jacket image 22P by being moved downward. At the same time, a display of the operation screen 21 is updated by the jacket images 22a to 22e corresponding to the pieces of music a to e as the new reproduction candidates since the groups G1 to G5 are reconstructed based on the meta information of the piece of music P as the new reproducing target.

In addition, the piece of music P which was the reproduction target immediately before becomes the last turn of the group which is arranged at the center at that time. Accordingly, in the display example in FIG. 3, the jacket image 22P which corresponds to the piece of music P which has been the reproduction target immediately before moves downward, and is displayed at a portion where the jacket image $22a_{N1}$ was displayed.

Similarly, when a user performs flicking upward with respect to the surface of the touch panel 12, a piece of music corresponding to the jacket images 22 which is displayed right under (immediately under) the jacket image 22P of the piece of music P as the reproduction target is newly selected as a reproducing target.

For example, in the display example in FIG. 3, the jacket image $22a_{N1}$ is displayed right under the jacket image 22P of the piece of music P as the reproducing target, and the piece of music $a_{N1}$ corresponding to the jacket image $22a_{N1}$ is newly selected as a reproducing target. According to this, the jacket image $22a_{N1}$ moves upward, and is displayed at a position of the jacket image 22P. Similarly, a display of the operation screen 21 is updated by the jacket images 22a to 22e corresponding to the pieces of music a to e which are newly set as the reproduction targets, when the groups G1 to G5 are reconstructed based on the meta information of the piece of music P which is newly set as the reproducing target.

In addition, when a user taps the jacket image 22P which is displayed on the operation screen 21 in the middle of reproducing the piece of music P, the jacket image 22P is displayed by being changed as if being pushed, and reproducing of the piece of music is stopped. In addition, if the user taps the jacket image 22P which is displayed on the operation screen 21 when the reproducing of the piece of music P is stopped, the jacket image 22P is displayed by being changed as if being pushed, and the reproducing of the piece of music P is restarted.

In addition, when the user taps any one of the jacket images 22a to 22c of the piece of music as the reproduction candidate which is displayed on the operation screen 21, a piece of music corresponding to the jacket image 22 is newly selected as a reproducing target. According to this, the tapped jacket image 22 moves, and is displayed at the position of the jacket image 22P. At the same time, a display of the operation screen 21 is updated by the jacket images 22a to 22e corresponding to the pieces of music a to e which are newly set as the reproduction candidates, when the groups G1 to G5 are reconstructed based on the meta information of the piece of music P which is newly set as the reproducing target.

In this manner, in the reproducing device 11, it is possible to cause a user to select a piece of music as a reproduction candidate by causing displays of the jacket images 22a to 22c of the pieces of music as the reproduction targets to slide to the horizontal direction. In this manner, the user is able to view a plurality of piece of music as the reproduction targets candidate at a glance, and to simply find out a desired piece of music among the pieces of music a to e which are related to the piece of music as the reproducing target, respectively. In addition, the user is able to easily select and reproduce (jump reproduction) the piece of music as the reproduction target by tapping the jacket image 22 corresponding to the desired piece of music.

In addition, in the reproducing device 11, it is possible to widen a connection due to the meta information of the piece of music since the pieces of music a to e as the reproduction candidates are switched every time the piece of music P as the reproduction target is changed by flicking of the user in the vertical direction. In this manner, the user is able to find out new relevance between pieces of music which is different from a common reproducing method, and to further enjoy the reproducing of the piece of music. Further, in the reproducing device 11, it is possible to greatly change an atmosphere of the operation screen 21 due to a piece of music which is stored by the storage unit 13.

In addition, in the reproducing device 11, when reproducing of a piece of music as a reproduction target is completed, a piece of music corresponding to the jacket image 22 which is displayed right above the jacket image 22P of the piece of music P as the reproduction target is newly selected as a reproducing target, similarly to the case where the flicking is performed downward with respect to the surface of the touch panel 12. In this manner, in the reproducing device 11, it is possible to continuously reproduce a piece of music included in the group in the column of the jacket images 22 which is displayed at the center of the operation screen 21 when the reproducing of the piece of music P as the reproduction target is completed, even when an operation is not performed by a user.

For example, the piece of music c of which a release year is the same as that of the piece of music P is reproduced after completing the piece of music P as the reproduction target only by performing flicking in the horizontal direction with respect to the surface of the touch panel 12, and arranging the column of the jacket image 22c corresponding to the piece of music c of which a release year is the same as the piece of music P at the center of the operation screen 21, by a user.

In this manner, in the display example in FIG. 3, as being displayed in double frame lines, the column of the jacket image 22 which is displayed at the center of the operation screen 21 is displayed by being highlighted compared to other columns of the jacket image 22, since it is reproduced prior to other columns of the jacket image 22.

In addition, on the operation screen 21, as shown in FIG. 3, in the jacket images 22a to 22e corresponding to the pieces of music a to e as the reproduction targets candidates, a jacket image 22 which is arranged at the lower side is displayed to be large, and the jacket image is displayed to be small when being arranged at the upper side. In addition, though it is not denoted in FIG. 3, the jacket images 22a to 22e are displayed to be thick when being arranged upward. In this manner, the jacket images 22a to 22e are displayed with a sense of depth, and it denotes that a jacket image which is arranged downward is on the near side, that is, of which the reproducing turn is prior to others.

In addition, there is a case where the length of the operation screen 21 in the horizontal direction is shorter than a specified value according to a size of the touch panel 12 of the reproducing device 11, and in this case, the jacket image 22P, and the jacket images 22a to 22e are displayed by being overlapped with each other depending on the above described sense of depth.

Figure 5:
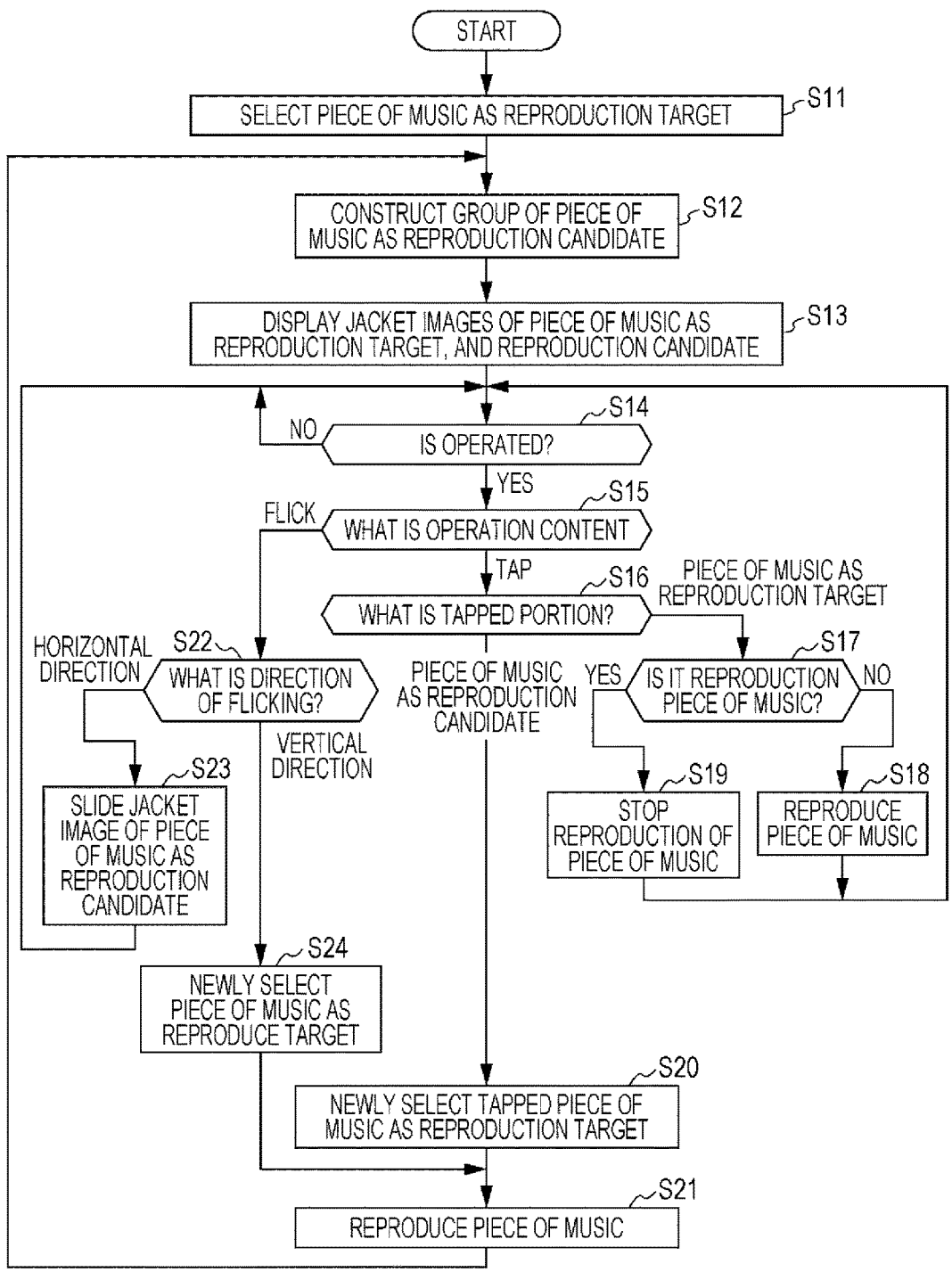
FIG. 5 is a flowchart which illustrates a reproducing method in which a reproducing device reproduces a piece of music.

Subsequently, a method of reproducing the piece of music by the reproducing device 11 will be described with reference to the flowchart in FIG. 5.

For example, when a user performs an operation with respect to the reproducing device 11 so as to execute an application program for reproducing a piece of music, then processing is started, and in step S11, the control unit 19 randomly selects the piece of music P as the reproduction target among the pieces of music stored in the storage unit 13. Alternatively, when information denoting a piece of music to be reproduced lastly is stored in the storage unit 13 in the reproducing device 11, the control unit 19 selects the piece of music to be reproduced lastly as a reproducing target.

In step S12, the control unit 19 informs the group construction unit 15 of the piece of music P as the reproducing target, and performs a control with respect to the group construction unit 15 so as to construct a group of a piece of music as a reproduction target based on meta data of the piece of music P.

The group construction unit 15 reads out metadata of the piece of music as the reproduction target from the storage unit 13, retrieves the storage unit 13 using the artist name P of the piece of music P as the reproducing target, and constructs the group G2 in which the piece of music b sang by the same artist as the piece of music P, as the reproduction target is included. Similarly, the group construction unit 15 retrieves the storage unit 13 using the release year P, the album title P, and the composer P of the piece of music P as the reproducing target, and constructs the group G3, G4, and G5, respectively. In addition, the group construction unit 15 constructs the group G1 in which all of the pieces of music a stored in the storage unit 13 are included.

In step S13, the control unit 19 performs a control with respect to the display control unit 16 so that the operation screen 21 on which the jacket image P, and the jacket images 22a to 22e are arranged based on the piece of music P as the reproducing target.

The display control unit 16 reads out the jacket image P, and the meta information which are stored in the storage unit 13 by being correlated with the piece of music P as the reproduction target from the storage unit 13. In addition, as described above referring to FIG. 3, the display control unit 16 creates an operation screen 21 on which the title P, the artist name P, the album title P, and the release year P of the piece of music P are arranged along with the jacket image P. Further, as described above referring to FIG. 3, the display control unit 16 reads out the jacket images 22a to 22e which are displayed on the operation screen 21 from the storage unit 13, and creates an operation screen 21 on which the jacket images 22a to 22e are arranged with reference to the groups G1 to G5 which are constructed by the group construction unit 15. In addition, the display control unit 16 supplies image data in which the created operation screen 21 is displayed to the display unit 12B, and displays the image data by being included in a display range of the display unit 12B.

In step S14, the control unit 19 determines whether or not an operation is performed by a user, and delays processing until it is determined that an operation has performed by a user. For example, when a user performs an operation with respect to the touch panel 12, the operation information obtaining unit 14 obtains operation information based on touch data from the operation unit 12A, supplies the information to the control unit 19, and the control unit 19 determines that an operation has performed by the user, and then the process proceeds to step S15.

In step S15, the control unit 19 determines whether an operation content which is made by the user is tapping, or flicking based on the operation information which is supplied from the operation information obtaining unit 14.

When the control unit 19 determines that the operation content which is made by the user is tapping in step S15, the process proceeds to step S16. In step S16, the control unit 19 determines whether the portion which is tapped by the user is a region in which the jacket image 22P corresponding to the piece of music P as the reproduction target is displayed, or a region in which the jacket images 22a to 22e corresponding to the pieces of music a to e as the reproduction candidates are displayed based on the operation information which is supplied from the operation information obtaining unit 14.

When it is determined that the portion which is tapped by the user is the region in which the jacket image 22P corresponding to the piece of music P as the reproduction target is displayed in step S16, the process proceeds to step S17, and the control unit 19 determines whether or not the piece of music is being reproduced.

In step S17, when it is determined that the piece of music is not being reproduced by the control unit 19, the process proceeds to step S18. In step S18, the control unit 19 performs a control with respect to the reproducing process unit 17 so as to reproduce the piece of music P which is selected as a reproducing target, and the reproducing process unit 17 reads out data of the piece of music P as the reproduction target from the storage unit 13, outputs the piece of music P, and outputs from the output unit 18. After the processing in step S18, the process returns to step S14, and the same processing is repeated, thereafter.

On the other hand, in step S17, when the control unit 19 determines that the piece of music is not being reproduced, the process proceeds to step S19. In step S19, the control unit 19 performs a control with respect to the reproducing process unit 17 so as to stop reproducing of the piece of music P, and the reproducing process unit 17 stops reproducing of the piece of music P. The process returns to step S14 after the processing in step S19, and the same processing is repeated, thereafter.

On the other hand, in step S16, when the control unit 19 determines that the portion tapped by the user is the region in which the jacket images 22a to 22e corresponding to the pieces of music a to e as the reproduction candidates are displayed, the process proceeds to step S20.

In step S20, the control unit 19 newly selects a piece of music corresponding to the jacket image 22 which is tapped by the user as a reproducing target.

In step S21, the control unit 19 performs a control with respect to the reproducing process unit 17 so as to reproduce the piece of music P which is newly selected as the reproduction target in step S20. The reproducing process unit 17 reads out data of the piece of music P as the reproduction target from the storage unit 13, reproduces the piece of music P, and outputs the piece of music P from the output unit 18, and then the process returns to step S12, and the same processing is repeated thereafter. That is, in this case, a group based on the piece of music P which is set as the new reproduction target in step S20 is constructed in step S12, and in step S13, a display of the operation screen 21 is changed based on the piece of music P which is set as the new reproduction target in step S20.

On the other hand, in step S15, when the control unit 19 determines that the operation content made by the user is flicking, the process proceeds to step S22. In step S22, the control unit 19 determines whether the direction of flicking is the horizontal direction, or the vertical direction based on the operation information which is supplied from the operation information obtaining unit 14.

In step S22, when the control unit 19 determines that the direction of flicking is the horizontal direction, the process proceeds to step S23.

In step S23, the control unit 19 performs a control with respect to the display control unit 16 so that the jacket images 22a to 22e corresponding to the pieces of music a to e as the reproduction candidates are slid to the direction in which the user performs the flicking. As described with reference to FIG. 4, the display control unit 16 causes the jacket images 22a to 22e corresponding to the pieces of music a to e as the reproduction candidates to be slid, and changes the jacket image 22 which is displayed on the operation screen 21. Thereafter, the process returns to step S14, and the same processing is repeated thereafter.

On the other hand, in step S22, when the control unit 19 determines that the direction of flicking is the vertical direction, the process proceeds to step S24.

In step S24, the control unit 19 newly selects a piece of music as a reproduction target according to the direction of flicking which is performed by the user. For example, in the example of the operation screen 21 which is shown in FIG. 3, when the user performs flicking downward, the control unit 19 selects the piece of music $a_1$ corresponding to the jacket image $22a_1$ which is displayed right above the jacket image 22P as the reproducing target. On the other hand, when the user performs the flicking upward, the control unit 19 newly selects the piece of music $a_{N1}$ corresponding jacket image $22a_{N1}$ which is displayed right above the jacket image 22P as a reproducing target.

After the processing in step S24, the process proceeds to step S21, and the same processing is performed thereafter. In this case, in step S21, the piece of music P which is newly set as the reproduction target in step S24 is reproduced, and in step S12, a group based on the piece of music P which is newly set as the reproduction target in step S24 is constructed. In addition, in step S13, a display of the operation screen 21 is updated based on the piece of music P which is newly set as the reproduction target in step S24.

As described above, in the reproducing device 11, a display of the jacket images 22a to 22e corresponding to the pieces of music a to e as the reproduction candidates which are classified in the five groups G1 to G5 is slid when the user performs flicking in the horizontal direction. In this manner, the user is able to select and reproduce a piece of music which is variously related to the piece of music P as the reproducing target, such as the artist, or the release year, by selecting the music further conveniently.

Accordingly, in the reproducing device 11, the user is able to easily find out a desired piece of music since the pieces of music as the reproduction candidates which are classified based on the relevance of the piece of music which is being reproduced are displayed on the operation screen 21 even when extremely large amount of pieces of music are stored in the storage unit 13. For example, the user is able to simply find out, and reproduce a desired piece of music of the day only by performing flicking in the vertical direction, and the horizontal direction.

In addition, in the reproducing device in the related art, it is assumed that a user usually reproduces a piece of music by a decided pattern, and there is a piece of music which is rarely reproduced using a common reproducing method which is performed by a user. In contrast to this, in the reproducing device 11, the piece of music which is rarely reproduced using the common reproducing method which is performed by a user is displayed as reproducing target, since a group is reconstructed every time a piece of music as a reproduction target is changed, accordingly, it is possible to suggest a new association with the pieces of music. In addition, in the reproducing device 11, it is not necessary for a user to create a play list, and the piece of music is not reproduced in a decided order. Accordingly, the user is able to enjoy music reproduction by sequentially selecting pieces of music with a fresh feeling when regularly using the reproducing device 11 every day in commuting or the like.

In addition, in the reproducing device 11, it is possible to set a piece of music which is stored on a server as a reproduction candidate by reproducing the piece of music stored in the server which is connected through the Internet, and using meta information of the piece of music, in addition to the pieces of music which are stored in the storage unit 13. For example, it is possible to increase an opportunity of buying the piece of music by reproducing a piece of music which is audible on a website which sells pieces of music. In addition, the reproducing device 11 may obtain the jacket image 22 through a network when the jacket image 22 is not correlated with the piece of music which is stored in the storage unit 13. Similarly, the reproducing device 11 may obtain meta information of the piece of music which is stored in the storage unit 13 through a network.

In addition, the display control unit 16 causes a RAM (Random Access Memory) to temporarily store the jacket image 22 which is read out from the storage unit 13, and creates the operation screen 21 to be displayed on the display unit 12B. At this time, the plurality of jacket images 22 are displayed on the operation screen 21, however, the display control unit 16 is able to perform display processing at high speed by releasing the RAM every time the operation screen 21 is created. In addition, the display control unit 16 is able to relieve stress of a user which is felt until a display of the operation screen 21 is completed, by starting a display of the jacket image 22 which is displayed at the center of the operation screen 21 by reading out in advance.

In addition, according to the embodiment, reproducing of a piece of music has been described, however, the reproducing device 11 can reproduce various contents which can be classified using meta information such as a still image, animation, and an application, in addition to the piece of music.

The above described series of processes can be executed using hardware, or using software, as well. When the series of processes is executed using the software, a program configuring the software is installed from a program recording medium in which a program is recorded to a computer which is incorporated in dedicated hardware, a general-purpose personal computer, for example, which can execute various functions by installing various programs, or the like.

Figure 6:
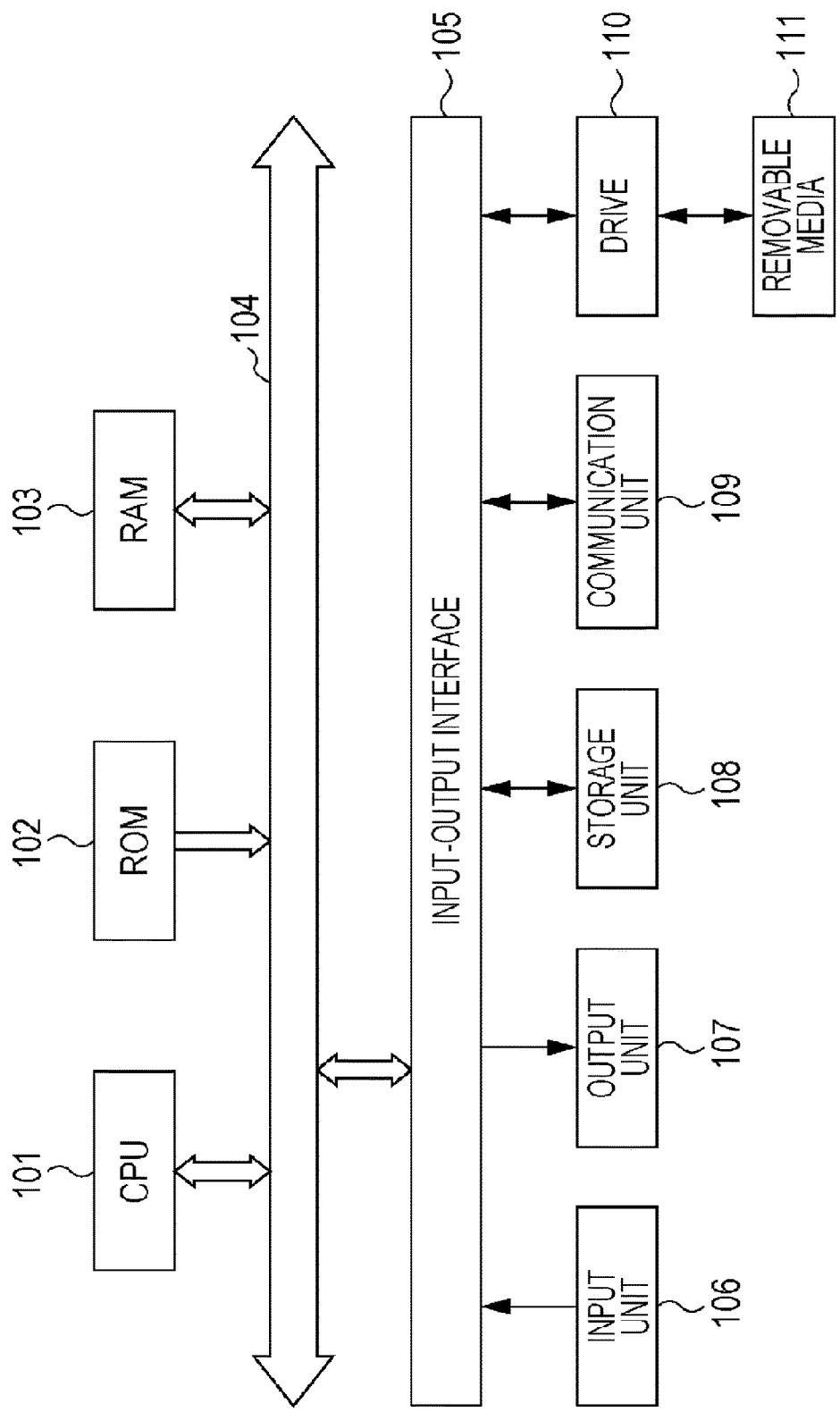
FIG. 6 is block diagram which illustrates a configuration example of a computer.

FIG. 6 is a block diagram which illustrates a configuration example of hardware of a computer in which the above described series of processes is executed using a program.

In the computer, a CPU (Central Processing Unit) 101, a ROM (Read Only Memory) 102, and a RAM (Random Access Memory) 103 are connected to each other through a bus 104.

An input-output interface 105 is further connected to the bus 104. The input-output interface 105 is connected with an input unit 106 which inputs operations of the touch panel 12 in FIG. 1, an output unit 107 corresponding to the display unit 12B in FIG. 1, the output unit 18, or the like, a storage unit 108 which is configured by a hard disk, a non-volatile memory, or the like, a communication unit 109 which is configured by a network interface or the like, and a drive 110 which drives removable media 111 such as a magnetic disk, an optical disc, a magneto-optical disc, or a semiconductor memory, or the like.

In the computer which is configured as above, the above described series of process is performed by the CPU 101 which loads, for example, a program which is stored in the storage unit 108 to the RAM 103 through the input-output interface 105 and the bus 104, and executes the program.

The program which is executed by the computer (CPU 101) is provided by being recorded in the removable media 111 as a package media which is configured by, for example, the magnetic disk (including flexible disk), the optical disc (CD-ROM (Compact Disc-Read Only Memory), DVD (Digital Versatile Disc) or the like)), the magneto-optical disc, the semiconductor memory, or the like, or through a wired, or wireless transmission medium such as a local area network, the Internet, or digital satellite broadcasting.

In addition, the program can be installed to the storage unit 108 through the input-output interface 105 by mounting the removable media 111 on the drive 110. In addition, the program is received in the communication unit 109 through the wired or wireless transmission medium, and can be installed to the storage unit 108. In addition to that, the program can be installed to the ROM 102, or the storage unit 108 in advance.

In addition, each processing which has been described referring to the above described flowchart is not necessarily processed in time sequence according to the described order as a flowchart, and may also include a process which is executed in parallel, or individually (for example, parallel process, or process using object). In addition, the program may be processed using one CPU, or may be processed by being distributed using a plurality of CPUs.

In addition, the present technology can be configured as follows.

(1) An apparatus including:
a controller configured to
generate a plurality of groups of content, each group including a plurality of content stored on a storage unit, the controller generating the plurality of groups based on information describing a selected content and information describing other content,
control a display to display at least one content from each of at least two of the plurality of groups of content, and
control the display to change display of the at least two of the plurality of groups of content based on a user command.

(2) The apparatus according to (1), wherein the information is text information.

(3) The apparatus according to (1) or (2), wherein the controller is configured to control a reproducing unit to reproduce the selected content.

(4) The apparatus according to (3), further comprising the storage unit, the display, and the reproducing unit.

(5) The apparatus according to (3), wherein the controller is configured to control the display to change display of the at least two of the plurality of groups of content by moving display of the at least two of the plurality of groups in a first direction indicated by the user command without affecting reproduction of the selected content.

(6) The apparatus according to (3), wherein the user command is a flick operation, and the controller is configured to move display of the at least two of the plurality of groups in a direction of the flick operation without affecting reproduction of the selected content.

(7) The apparatus according to (5), wherein the controller is configured to change a content being reproduced based on a user command in a second direction substantially perpendicular to the first direction.

(8) The apparatus according to (5), wherein the controller is configured to control display of the at least two of the plurality of groups such that items in each group are aligned in the first direction.

(9) The apparatus according to (1) to (8), wherein the controller is configured to control display of the at least two of the plurality of groups such that only a first number of items in each group and a last number of items in each group are displayed.

(10) The apparatus according to (3), wherein the controller is configured to control the display to display an image associated with each item being displayed, and an image associated with the current content is lower than a center of the display.

(11) The apparatus according to (10), wherein the controller is configured to control the reproducing unit to start or stop reproduction of the selected content when the image associated with the selected content is selected by a user.

(12) The apparatus according to (10), wherein the controller is configured to control the reproducing unit to reproduce another content when the image associated with the another content is selected by a user.

(13) The apparatus according to (10), wherein the controller is configured to control the display to display images associated with items in a current group above the image associated with the selected content.

(14) The apparatus according to (13), wherein the controller is configured to control the display to highlight items associated with the current group.

(15) The apparatus according to (13), wherein the controller is configured to control the reproduction device to reproduce a content in the current group which is directly above the selected content after reproduction of the selected content is finished.

(16) The apparatus according to (10), wherein the controller is configured to control the display to display an image associated with a last member of each group as a thinner image than images associated with other content in each group.

(17) The apparatus according to (10), wherein the controller is configured to control the display to display each image to have an increasing size as each image approaches the image associated with the selected content, and the image associated with the selected content is a largest image displayed.

(18) The apparatus according to (1) to (17), wherein the controller determines the groups based on a title of each content, an artist name of each content, an album title of each content, a composer of each content, or a release year of each content.

(19) A method including:
generating a plurality of groups of content, each group including a plurality of content stored on a storage unit, the controller generating the plurality of groups based on information describing a selected content and information describing other content, controlling a display to display at least one content from each of at least two of the plurality of groups of content, and controlling the display to change display of the at least two of the plurality of groups of content based on a user command.

(20) A non-transitory computer readable medium encoded with a program that, when loaded on a processor, causes the processor to perform a method including:

generating a plurality of groups of content, each group including a plurality of content stored on a storage unit, the controller generating the plurality of groups based on information describing a selected content and information describing other content, controlling a display to display at least one content from each of at least two of the plurality of groups of content, and controlling the display to change display of the at least two of the plurality of groups of content based on a user command.

(21) A reproducing device including, a classification unit which classifies contents as reproduction candidates into each group corresponding to a plurality of associations in the content as the reproduction candidate among the plurality of content items, a display unit which displays an image which is related to the content as the reproduction candidate which is included in a predetermined number of groups among the plurality of groups which are classified by the classification unit, a switching unit which switches the predetermined number of groups displayed on the display unit according to an operation of a user, and a selection unit which selects the content as a reproduction target among the contents as the reproduction candidates.

(22) The reproducing device which is disclosed in (21), in which the display unit displays the image relating to the content of the reproduction candidate by a plurality of pieces in each group along a first direction in each of the groups, and in which the switching unit slides the image which is related to the content as the reproduction candidate to a second direction according to an operation of a user denoting the second direction which is approximately orthogonal to the first direction, and switches a predetermined number of groups which are displayed on the display unit.

(23) The reproducing device which is disclosed in (21), or (22), in which the display unit displays the image which is related to the content as the reproduction target at a predetermined position, and displays the image which is related to the content as the reproduction candidate on one side in the first direction, and in which the selection unit selects the content corresponding to the image which is displayed on the one side in the first direction directly from the predetermined position as content which is a new reproducing target, according to an operation of a user which directs from the one side to the other side in the first direction.

(24) The reproducing device which is disclosed in any one of (21) to (23), in which the display unit displays the image relating to the content as a new reproduction target at the predetermined position when the content as the new reproduction target is selected by the selection unit, and displays the image relating to the content which was the reproduction target right before on the other side in the first direction directly from the predetermined position.

(25) The reproducing device which is disclosed in any one of (21) to (24), in which the selection unit selects the content corresponding to the image which is displayed on the one side in the first direction directly from the predetermined position as content which is the new reproduction target when reproducing of the content as the reproduction target is completed.

(26) The reproducing device which is disclosed in any one of (21) to (25), in which, when a user performs an operation of designating the image relating to the content as the reproduction candidate which is displayed on the display unit, the selection unit selects the content corresponding to the designated image as content which is a new reproducing target.

In addition, the embodiments of the present technology are not limited to the above described embodiments, and may be variously modified without departing from the scope of the present disclosure.

REFERENCE SIGNS LIST

11: REPRODUCING DEVICE
12: TOUCH PANEL
12A: OPERATION UNIT
12B: DISPLAY UNIT
13: STORAGE UNIT
14: OPERATION INFORMATION OBTAINING UNIT
15: GROUP CONSTRUCTION UNIT
16: DISPLAY CONTROL UNIT
17: REPRODUCING PROCESS UNIT
18: OUTPUT UNIT
19: CONTROL UNIT
21: OPERATION SCREEN
22: JACKET IMAGE
23: LEFT DIRECTION MARK
24: RIGHT DIRECTION MARK

The invention claimed is:
1. An apparatus, comprising:
a touch screen panel comprising a display screen; and
one or more processors configured to:
  receive a first user operation on the touch screen panel to execute an application program of the apparatus;
  select a first target content in response to the received first user operation;
  control, based on the first user operation, the touch screen panel to display a first image corresponding to the first target content at a predetermined position on the display screen;
  control, based on the first user operation, the apparatus to reproduce a first content item corresponding to the first target content;
  generate a plurality of groups of contents based on metadata of the first target content;
  control, based on the first user operation, the touch screen panel to display at least two groups of the plurality of groups of contents,
  wherein
    a first group, of the displayed at least two groups, comprises a first plurality of images,
    each of the first plurality of images corresponds to a respective content item of a first plurality of content items of the first group,
    the first plurality of images are displayed, at a first position aligned, in a first direction, with the first image corresponding to the first target content displayed at the predetermined position,
    a second group, of the displayed at least two groups, comprises a second plurality of images, each of the second plurality of images corresponds to a respective content item of a second plurality of content items of the second group, and the second plurality of images are displayed at a second position aligned with the first plurality of images in a second direction perpendicular to the first direction;

control the touch screen panel to highlight each of the first plurality of images of the first group displayed at the first position based on a priority of a reproduction turn, of the first plurality of content items of the first group, that is higher with respect to a priority of a reproduction turn of the second plurality of content items of the second group displayed at the second position, wherein each of the first plurality of images of the first group is highlighted by display of each of the first plurality of images of the first group inside double frame lines;

receive a second user operation on the touch screen panel, wherein the second user operation is in the second direction perpendicular to the first direction;

control, based on the second user operation, the touch screen panel to move the second plurality of images, along the second direction, from the second position to the first position aligned, in the first direction, with the first image corresponding to the first target content displayed at the predetermined position, and move the first plurality of images, along the second direction, from the first position to a third position;

control the touch screen panel to highlight each of the second plurality of images of the second group moved to the first position based on the priority of the reproduction turn, of the second plurality of content items of the second group, being higher with respect to the priority of the reproduction turn of the first plurality of content items of the first group moved to the third position, wherein each of the second plurality of images of the second group is highlighted by display of each of the second plurality of images of the second group inside the double frame lines;

receive a third user operation on the touch screen panel, wherein the third user operation is in the first direction;

select, based on the third user operation, a second target content from the second plurality of content items of the second group;

control, based on the third user operation, the touch screen panel to display a second image corresponding to the selected second target content at the predetermined position on the display screen;

control, based on the third user operation, the apparatus to reproduce a second content item corresponding to the second target content;

regenerate the plurality of groups of contents based on metadata of the second target content; and control, based on the third user operation, the touch screen panel to update the displayed at least two groups based on the regenerated plurality of groups.

2. The apparatus according to claim 1, wherein the metadata of the first and second target content is text information.

3. The apparatus according to claim 1, wherein the second user operation is a flick operation.

4. The apparatus according to claim 1, wherein the second plurality of images comprises a first sub-image of a first content item of the second plurality of content items and a second sub-image of a last content item of the second plurality of content items.

5. The apparatus according to claim 1, wherein the predetermined position is lower than center of the touch screen panel.

6. The apparatus according to claim 5, wherein the touch screen panel is further configured to receive a fourth user operation on the second image corresponding to the selected second target content, and the one or more processors are further configured to control, based on the fourth user operation, one of start or stop of the reproduction of the second target content.

7. The apparatus according to claim 5, wherein the touch screen panel is further configured to receive a fourth user operation on a third image, the third image is associated with a third target content, and the one or more processors are further configured to control, based on the fourth user operation, the display screen to reproduce the third target content.

8. The apparatus according to claim 5, wherein the second plurality of images comprises the second image corresponding to the second target content, and the one or more processors are further configured to control the display screen to display the second plurality of images, other than the second image, and the second plurality of images above the predetermined position of the second image.

9. The apparatus according to claim 8, wherein the one or more processors are further configured to control the display screen to:

reproduce the second plurality of content items other than the second target content of the second group subsequent to the reproduction of the second target content, and display the second plurality of images, other than the second image, of the second group directly above the predetermined position of the second image.

10. The apparatus according to claim 5, wherein the one or more processors are further configured to control the display screen to display a third plurality of images associated with the plurality of groups of contents, each of a fourth plurality of images of the third plurality of images is associated with a respective last content of each group of the plurality of groups of contents, a fifth plurality of images of the third plurality of images are associated with contents other than the respective last content of each group of the plurality of groups of contents, and the displayed fourth plurality of images are thinner than the displayed fifth plurality of images.

11. The apparatus according to claim 5, wherein the second plurality of images includes the second image corresponding to the second target content, the one or more processors are further configured to control the display screen to display the second image, a third image of the second plurality of images, and a fourth image of the second plurality of images in a vertical direction, in this order, a displayed dimension of each of the fourth image, the third image, and the second image is in an increasing order, and the displayed dimension of the second image is largest among displayed dimensions of the second plurality of images.

12. The apparatus according to claim 1, wherein the one or more processors are further configured to generate the plurality of groups of contents, based on at least one of a title of the first target content, an artist name of the first target content, a composer of the first target content, or a release year of the first target content.

13. A method, comprising:
receiving a first user operation on a touch screen panel of an apparatus, the touch screen panel comprising a display screen, to execute an application program of the apparatus;
selecting a first target content in response to the received first user operation;
controlling, based on the first user operation, the touch screen panel to display a first image corresponding to the first target content at a predetermined position on the display screen;
controlling, based on the first user operation, the apparatus to reproduce a first content item corresponding to the first target content;
generating a plurality of groups of contents based on metadata of the first target content;
controlling, based on the first user operation, the touch screen panel to display at least two groups of the plurality of groups of contents,
wherein a first group of the displayed at least two groups comprises a first plurality of images,
each of the first plurality of images corresponds to a respective content item of a first plurality of content items of the first group,
the first plurality of images are displayed, at a first position aligned, in a first direction, with the first image corresponding to the first target content displayed at the predetermined position,
a second group of the displayed at least two groups comprises a second plurality of images,
each of the second plurality of images corresponds to a respective content item of a second plurality of content items of the second group, and
the second plurality of images are displayed at a second position aligned with the first plurality of images in a second direction perpendicular to the first direction;
controlling the touch screen panel to highlight each of the first plurality of images of the first group displayed at the first position based on a priority of a reproduction turn, of the first plurality of content items of the first group, that is higher with respect to a priority of a reproduction turn of the second plurality of content items of the second group displayed at the second position,
wherein each of the first plurality of images of the first group is highlighted by display of each of the first plurality of images of the first group inside double frame lines;
receiving a second user operation on the touch screen panel,
wherein the second user operation is in the second direction perpendicular to the first direction;
controlling, based on the second user operation, the touch screen panel to move the second plurality of images, along the second direction, from the second position to the first position aligned, in the first direction, with the first image corresponding to the first target content displayed at the predetermined position, and move the first plurality of images, along the second direction, from the first position to a third position;
controlling the touch screen panel to highlight each of the second plurality of images of the second group moved to the first position based on the priority of the reproduction turn, of the second plurality of content items of the second group, being higher with respect to the priority of the reproduction turn of the first plurality of content items of the first group moved to the third position,
wherein each of the second plurality of images of the second group is highlighted by display of each of the second plurality of images of the second group inside the double frame lines;
receiving a third user operation on the touch screen panel, wherein the third user operation is in the first direction;
selecting, based on the third user operation, a second target content from the second plurality of content items of the second group;
controlling, based on the third user operation, the touch screen panel to display a second image corresponding to the selected second target content at the predetermined position on the display screen;
controlling, based on the third user operation, the apparatus to reproduce a second content item corresponding to the second target content;
regenerating the plurality of groups of contents based on metadata of the second target content; and
controlling, based on the third user operation, the touch screen panel to update the displayed at least two groups based on the regenerated plurality of groups.

14. A non-transitory computer-readable medium having stored thereon, computer-executable instructions, which when executed by a processor in an apparatus, cause the processor to execute operations, the operations comprising:
receiving a first user operation on a touch screen panel of the apparatus, the touch screen panel comprising a display screen, to execute an application program of the apparatus;
selecting a first target content in response to the received first user operation;
controlling, based on the first user operation, the touch screen panel to display a first image corresponding to the first target content at a predetermined position on the display screen;
controlling, based on the first user operation, the apparatus to reproduce a first content item corresponding to the first target content;
generating a plurality of groups of contents based on metadata of the first target content;
controlling, based on the first user operation, the touch screen panel to display at least two groups of the plurality of groups of contents,
wherein a first group of the displayed at least two groups comprises a first plurality of images,
each of the first plurality of images corresponds to a respective content item of a first plurality of content items of the first group,
the first plurality of images are displayed, at a first position aligned, in a first direction, with the first image corresponding to the first target content displayed at the predetermined position,
a second group of the displayed at least two groups comprises a second plurality of images,
each of the second plurality of images corresponds to a respective content item of a second plurality of content items of the second group, and
the second plurality of images are displayed at a second position aligned with the first plurality of images in a second direction perpendicular to the first direction;
controlling the touch screen panel to highlight each of the first plurality of images of the first group displayed at the first position based on a priority of a reproduction turn, of the first plurality of content items of the first group, that is higher with respect to a priority of a reproduction turn of the second plurality of content items of the second group displayed at the second position, wherein each of the first plurality of images of the first group is highlighted by display of each of the first plurality of images of the first group inside double frame lines;

receiving a second user operation on the touch screen panel, wherein the second user operation is in the second direction perpendicular to the first direction;

controlling, based on the second user operation, the touch screen panel to move the second plurality of images, along the second direction, from the second position to the first position aligned, in the first direction, with the first image corresponding to the first target content displayed at the predetermined position, and move the first plurality of images, along the second direction, from the first position to a third position;

controlling the touch screen panel to highlight each of the second plurality of images of the second group moved to the first position based on the priority of the reproduction turn, of the second plurality of content items of the second group, being higher with respect to the priority of the reproduction turn of the first plurality of content items of the first group moved to the third position, wherein each of the second plurality of images of the second group is highlighted by display of each of the second plurality of images of the second group inside the double frame lines;

receiving a third user operation on the touch screen panel, wherein the third user operation is in the first direction;

selecting, based on the third user operation, a second target content from the second plurality of content items of the second group;

controlling, based on the third user operation, the touch screen panel to display a second image corresponding to the selected second target content at the predetermined position on the display screen;

controlling, based on the third user operation, the apparatus to reproduce a second content item corresponding to the second target content;

regenerating the plurality of groups of contents based on metadata of the second target content; and controlling, based on the third user operation, the touch screen panel to update the displayed at least two groups based on the regenerated plurality of groups.

* * * * *